Sept. 15, 1959   H. J. MILLER ET AL   2,904,366
QUICK RELEASE FASTENING APPARATUS
Filed Sept. 28, 1956
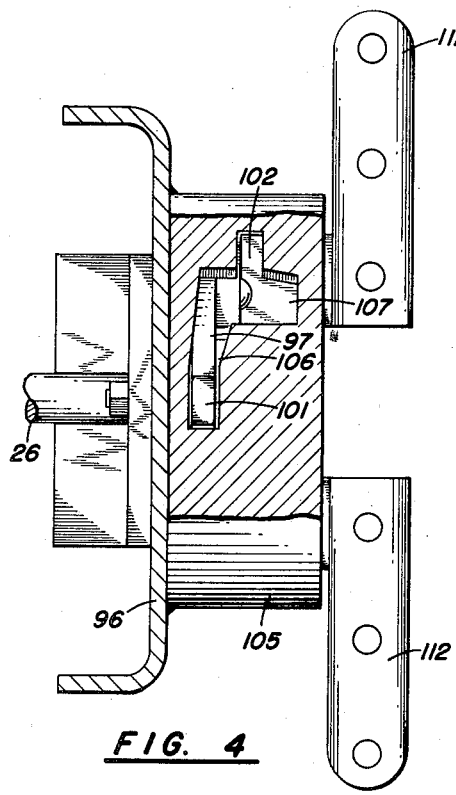
FIG. 4
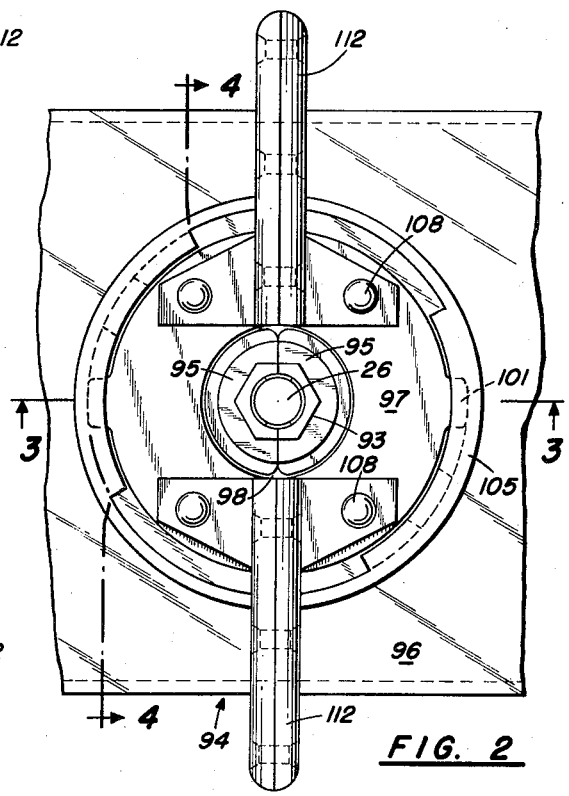
FIG. 2
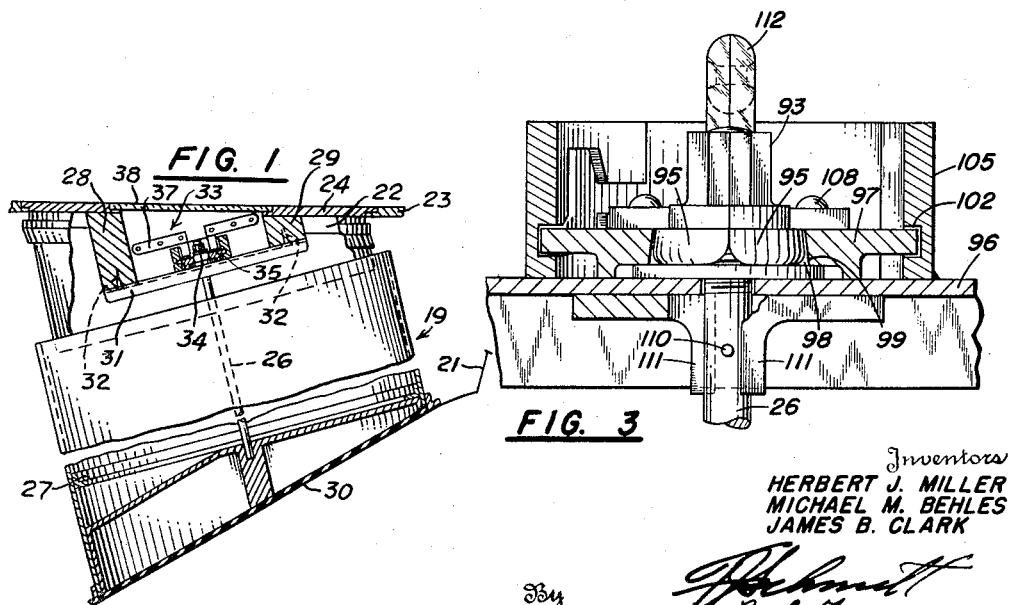
FIG. 1
FIG. 3
Inventors
HERBERT J. MILLER
MICHAEL M. BEHLES
JAMES B. CLARK
By
R. J. Tompkins
Attorneys United States Patent Office 2,904,366
Patented Sept. 15, 1959

2,904,366

QUICK RELEASE FASTENING APPARATUS

Herbert J. Miller, Baltimore County, Michael M. Behles, Baltimore, and James B. Clark, Baltimore County, Md., assignors, by mesne assignments, to the United States of America as represented by the Secretary of the Navy Application September 28, 1956, Serial No. 612,903

4 Claims. (Cl. 292—300)

This invention relates to quick release fastening apparatus and more particularly to a fastening apparatus having two identical members adapted to mate together to form an opening for receiving and securely holding the end of a rod, or the like, that is to be releasably held.

There are known fastening apparatus that can be quickly disconnected but do not provide a rigid attachment or, if a rigid attachment is provided, then the fastener cannot be quickly disconnected. Thus, the known fastening apparatus do not adequately provide for a quick disconnect and a rigid attachment in the same structure.

In the present invention, the fastening apparatus has two identical members which are mated together to form an opening for receiving and holding the end of a connecting rod, or the like, that is to be releasably held. There is further provided means which are adapted to maintain the two members in mating position when the connecting rod is being held or is adapted to release the two members from mating position and from engagement with the connecting rod thereby allowing the rod to fall free of the fastener. The connecting rod is under a constant tension load that tends to pull the rod out of engagement with the fastener unless the two mating members are in mating position to securely hold the rod. Therefore, an axially split fastener is provided that affords a rigid attachment which can be quickly disconnected without sacrificing the efficiency of the rigid attachment as in known constructions.

An object of the present invention is the provision of a fastener which provides a secure attachment while still being adapted to be quickly disconnected in case of emergency.

A further object of the invention is the provision of a fastener which is simple in construction, has a minimum number of parts and costs very little to produce.

Yet another object of the present invention is a split fastener holding a rod under a constant tension which will assist in releasing the rod from the split fastener when the fastener is allowed to separate.

Other objects and many of the attendant advantages of this invention will be readily appreciated as the same becomes better understood by reference to the following detailed description when considered in connection with the accompanying drawings wherein:

Fig. 1 shows a side elevation, partly in section, of one embodiment of the present invention which illustrates how the fastener is mounted in an escape chute of a seaplane.

Fig. 2 illustrates a plan view of another embodiment of the fastener device.

Fig. 3 is a section of the fastener device taken on line 3—3 of Fig. 2.

Fig. 4 is a section of the fastener device taken on line 4—4 of Fig. 2.

Referring now to the drawings, wherein like reference characters designate like or corresponding parts throughout the several views, there is shown in Fig. 1 a personnel escape chute 19 mounted in a seaplane hull 21. The upper end of the escape chute 19 is in line with and extends into an opening 22 in the floor 23 of the seaplane. An upper hatch or door 24 closes the opening 22 when the personnel escape chute is not in use. The lower end of the escape chute is closed by a lower hatch or door 25 having a pressure and water seal 30 connected thereto and conforming to the outline of the hull 21 of the seaplane. A connecting rod 26 is secured at its lower end to the lower hatch 25 and extends upwardly through the escape chute 19. Secured to the underside of the upper hatch 24 are two downwardly extending struts 28 and 29, made of a suitable material such as metal or wood, connected together by a metal plate 31 with screws 32 or any other equivalent means. Mounted on the plate 31 is a split screw-threaded fastener, generally indicated as 33, which engages the upper screw-threaded end of the rod 26. It can be readily seen that due to the weight of the lower hatch or door 25 a constant tension load is placed on the rod 26. This tension load assists in operating the split screw-threaded fastener 33. It will be understood that other types of fasteners, to be described hereinbelow, may be used instead of fastener 33.

The split fastener 33 has two identical screw-threaded members 34 which are held in position by a collar 35 that prevents the split fastener from separating under the tension load. In the event of an emergency, removal of the restraining collar allows the tension load to act and cause the two identical members to release their grip on the screw-threaded end of the rod 26.

In the embodiment of the fastener 33 shown in Fig. 1, the handle 37 is rotated to release the split fastener. An access opening in the upper hatch or door 24 is closed by an auxiliary door 38.

In case of an emergency, the operation of the assembly of Fig. 1 to provide an emergency escape passage for personnel is as follows: the auxiliary door 38 is opened and the handle 37 is rotated thereby removing the restraining collar 35 from the members 34; the rod 26 is then disengaged from the members 34 and falls downwardly due to the tension load caused by the weight of the lower hatch 25. The lower end of the escape chute is now clear. The upper end of the escape chute is cleared by lifting the upper hatch 24 upwardly carrying therewith the struts 28 and 29, the plate 31 and the split fastener 33.

It is to be understood that the following described embodiment can be substituted for the fastener device 33, shown in Fig. 1 to perform the same function.

Referring to Fig. 2, another embodiment of the split nut fastener is generally indicated by 94. The connecting rod 26 is threadedly engaged by the screw-threaded split nut members 95. The split nut members 95 rigidly hold the connecting rod 26 to a U-shaped plate 96 which is fastened by any suitable means to the plate 31 in the emergency escape chute assembly shown in Fig. 1. The nut members 95 are maintained in mating position by a collar 97 (Fig. 3) having a central opening 98 therein which has side walls 99 that taper upwardly and engage the sides of nut members 95 to provide a wedging action, thereby resulting in a tight threaded connection between the split nut members 95 and the rod 26. Collar 97 has two oppositely protruding cams 101 positioned on the outer periphery thereof which are guided by a bayonet cam slot 102 in a circular ring 105 that is attached to the U-shaped plate 96. The cam slot 102 has an elongated narrow portion 106 opening into a wider portion 107. The collar 97 has a handle 112 secured thereto, as by bolts 108.

A hexagonal head 93 is provided to the upper end of the split nut members 95 to receive a wrench for drawing the connecting rod upwardly for a tighter connection with the nut members 95. A pin 110 is inserted into the connecting rod 26 to prevent rotation thereof by coacting with the stops 111, which are secured to the underside of the plate 96.

When the emergency escape chute is to be used, the handle 112 is twisted in a clockwise direction, as best seen in Fig. 4, moving the cams 101 from the narrow portion 106 to the wider portion 107 of the cam slot 102. An upward pull on the handle 112 will raise the cams 101 up, into the wider portion 107 of the cam slot 102 and thus release the collar 97 from restraining engagement with the split nut members 95, which will fall away and become disengaged from the threaded end of the connecting rod 26 in the same manner as previously discussed.

Obviously many modifications and variations of the present invention are possible in the light of the above teachings. It is therefore to be understood that within the scope of the appended claims the invention may be practiced otherwise than as specifically described.

We claim:

1. A quick release fastening apparatus comprising a connecting rod to be supported and released having a tension load thereon, a supporting means having an opening therethrough, one end of said connecting rod passing through said opening, a split nut securely engaging the end of the rod passing through said opening, collar means surrounding said split nut to prevent separation thereof, said collar means having a pair of diametrically opposed cams at the outer periphery thereof, a cam plate surrounding said collar means and secured to said supporting means, and diametrically opposed bayonet cam slots formed in said cam plate and said cams lockingly engaging said bayonet cam slots.

2. A quick release fastening apparatus for release of an escape chute door comprising, a connecting rod secured at one end to said door and having the other end thereof threaded, supporting means mounted in said escape chute and having an opening therethrough, the threaded end of said rod passing through the opening, a threaded split nut engaging the threaded end of said rod, collar means surrounding said split nut to prevent separation thereof, handle means connected to said collar means, said collar means having a pair of diametrically opposed cams at the outer periphery thereof, a cam plate surrounding said collar means and secured to said support means, and diametrically opposed bayonet cam slots formed in said cam plate, said cams lockingly engaging said bayonet cam slots whereby when the handle is twisted, the cams are moved in said bayonet cam slots allowing the handle to be pulled upward carrying the restraining collar thereby permitting the split nut to separate and release said connecting rod.

3. The combination as set forth in claim 2 and a washer having an upper surface positioned between the split nut and the supporting means, said split nut having beveled surfaces in engagement with the upper surface of the washer, whereby a camming action will be obtained between the split nut and the washer.

4. The combination as set forth in claim 3 and said central opening in said collar being tapered with the larger diameter adjacent said washer, thereby providing a camming action when the tapered central opening restrainingly engages the split nut in the mating position.

References Cited in the file of this patent

UNITED STATES PATENTS

| 233,693 | Pettet | Oct. 26, 1880 |
| 537,113 | Holland | Apr. 9, 1895 |
| 556,892 | Landstra | Mar. 24, 1896 |
| 747,270 | Tayler | Dec. 15, 1903 |
| 1,117,826 | Flint | Nov. 17, 1914 |
| 1,130,475 | Campbell | Mar. 2, 1915 |
| 2,455,157 | Bigelow | Nov. 30, 1948 |
| 2,523,814 | Claud-Mantle | Sept. 26, 1950 |
| 2,780,264 | Aspey | Feb. 5, 1957 |